(12) United States Patent
Yang (10) Patent No.: US 8,454,200 B2
(45) Date of Patent: Jun. 4, 2013

(54) RING LIGHT APPARATUS WITH VARIABLE PROJECTION ANGLE

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 462 days.

(21) Appl. No.: 12/758,028

(22) Filed: Apr. 11, 2010

(65) Prior Publication Data

US 2010/0284184 A1 Nov. 11, 2010

(30) Foreign Application Priority Data

May 5, 2009 (TW) ................................ 98114812 A (51) Int. Cl.
*F21V 1/00* (2006.01)
*F21V 21/00* (2006.01)
(52) U.S. Cl.
USPC ..................................... 362/249.07; 362/235
(58) Field of Classification Search
None
See application file for complete search history.

(56) References Cited

U.S. PATENT DOCUMENTS

| 4,068,245 | A | | 1/1978 | Ohtaki et al. |
| 4,298,262 | A | * | 11/1981 | Nozawa et al. ............... 396/199 |
| 4,729,070 | A | * | 3/1988 | Chiu ............................. 362/33 |
| 6,554,452 | B1 | * | 4/2003 | Bourn et al. .................. 362/247 |
| 7,136,582 | B2 | * | 11/2006 | Hayami et al. ................ 396/199 |
| 2005/0135078 | A1 | | 6/2005 | Hamada et al. |
| 2005/0168624 | A1 | | 8/2005 | Hasegawa |
| 2005/0265708 | A1 | | 12/2005 | Toya |
| 2007/0014563 | A1 | * | 1/2007 | Ferro ............................ 396/199 |

FOREIGN PATENT DOCUMENTS

| JP | 2000292836 A | 10/2000 |
| JP | 2006-209035 A | 8/2006 |

OTHER PUBLICATIONS

Machine translation of JP 2006-209035A filed Aug. 10, 2006.*
Japan Official Action issued on Feb. 7, 2012.
Search Report Jun. 10, 2010.

* cited by examiner

*Primary Examiner* — Britt D Hanley (57) ABSTRACT

A ring light apparatus capable of varying projection angle includes an inner barrel passed through an axis, a support base arranged at an end of the inner barrel, a plurality of variable projection angle light emitting modules arranged on the support base, and a drive mechanism arranged outside the inner barrel and used for driving the variable projection angle light emitting modules to vary the projection angle, so as to provide a uniform light beam for a near object.

11 Claims, 9 Drawing Sheets

RING LIGHT APPARATUS WITH VARIABLE PROJECTION ANGLE

FIELD OF THE INVENTION

The present invention generally relates to a light apparatus, in particular to a ring light apparatus applied for photography.

BACKGROUND OF THE INVENTION

Macro photography refers to taking pictures of small objects at a close distance (such as a distance within approximately 30 cm) by a photographic device. In recent years, applications of macro photography are extended from ecological photography of animals and plants to high-magnification visual inspection and non-destructive inspection required in manufacturing processes of industrial products.

In the field of macro photography, the illumination for an object is relatively more important than general photography. In earlier times, a ring flashlight installed on the front of a lens was unable to provide continuous illuminations, and just provided synchronous light at the moment of taking a picture, so that a user couldn't make sure whether or not an object had received exact light from the flash light before taking the picture, and the user generally had to adjust the aperture and shutter speed of a camera based on the user's past experience, and thus a relatively high failure rate of taking pictures would result.

Recently, most ring lights adopt cold cathode fluorescent lamp (CCFL) or light emitting diode (LED) as a light source. Although the required continuous illumination is provided for previewing an object before a picture is taken, yet the object has a non-uniform brightness with a darker center and a brighter periphery if the ring light is very close to the object while the picture is being taken.

Furthermore, the ring light is annularly projected onto the object, but its projection angle is completely symmetric and unvarying. Thus the object illuminated by the ring light will have few shadows. In other words, the profile and details of the object can be illuminated clearly, but it may look not like a stereoscopic one.

SUMMARY OF THE INVENTION

Therefore, it is a primary objective of the present invention to provide a ring light apparatus capable of providing uniform brightness for macro photography.

To achieve the foregoing objective, the present invention discloses a ring light apparatus with variable projection angle, which includes an inner barrel, a support base disposed at an end of the inner barrel, a plurality of light emitting modules installed on the support base and capable of changing a light projection direction, and a drive mechanism installed outside the inner barrel for driving the light emitting modules to change their light projection direction.

In the present invention, the drive mechanism makes the light emitting modules change the light projection angle in order to provide a uniform light to a near object and avoid the non-uniform brightness with a darker center and a brighter periphery of the object caused by the conventional ring light.

DESCRIPTION OF THE PREFERRED EMBODIMENTS

The technical characteristics and contents of the present invention will become apparent with the following detailed description accompanied with related drawings.

Figure 1:
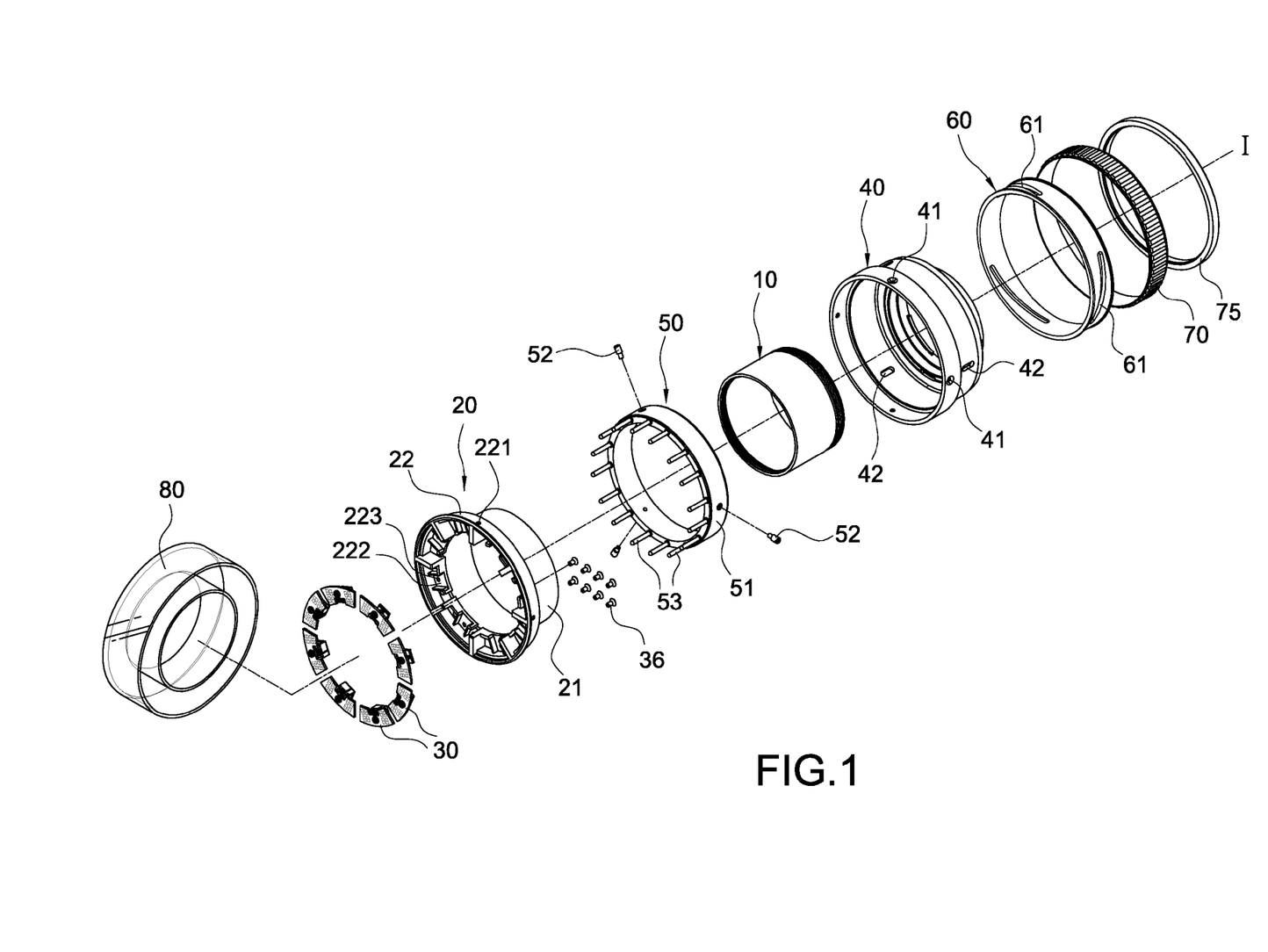
FIG. 1 is an exploded view of a variable projection angle ring light apparatus in accordance with the first preferred embodiment of the present invention.
Figure 2:
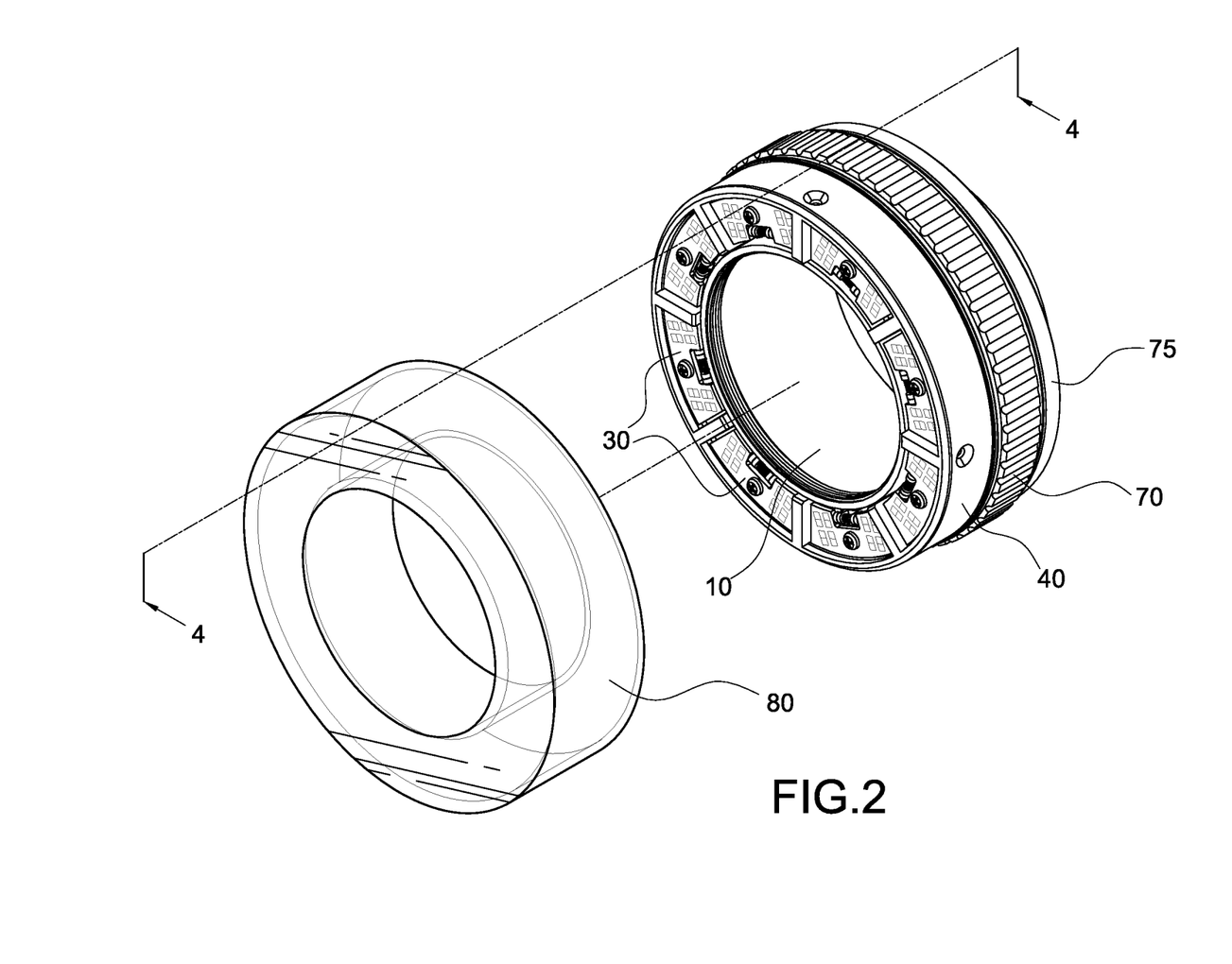
FIG. 2 is an exploded view of a ring light apparatus in accordance with the first preferred embodiment of the present invention.

With reference to FIGS. 1 and 2 for a ring light apparatus with variable projection angle in accordance with the first preferred embodiment of the present invention, the ring light apparatus comprises an inner barrel 10 along an axis I, a support base 20 disposed on the inner barrel 10, a plurality of light emitting modules 30 installed on the support base 20, and a drive mechanism for driving the light emitting modules 30 to change their light projection direction. The drive mechanism comprises an outer barrel 40 sheathing the inner barrel 10 and coupled to the support base 20, a pushing ring 50 installed between the inner barrel 10 and the outer barrel 40, and a rotating ring 60 sheathing the outer barrel 40.

The inner barrel 10 is a substantially hollow cylinder. The support base 20 is disposed at an end of the inner barrel 10 and substantially in a ring-shape. The support base 20 includes a tubular portion 21 sheathing the inner barrel 10, and an extended portion 22 extending radially outward from the tubular portion 21. The extended portion 22 includes a plurality of mounting surfaces 222 disposed on an inner side of the extended portion 22 for being mounted by the light emitting modules 30 separately.

Figure 3:
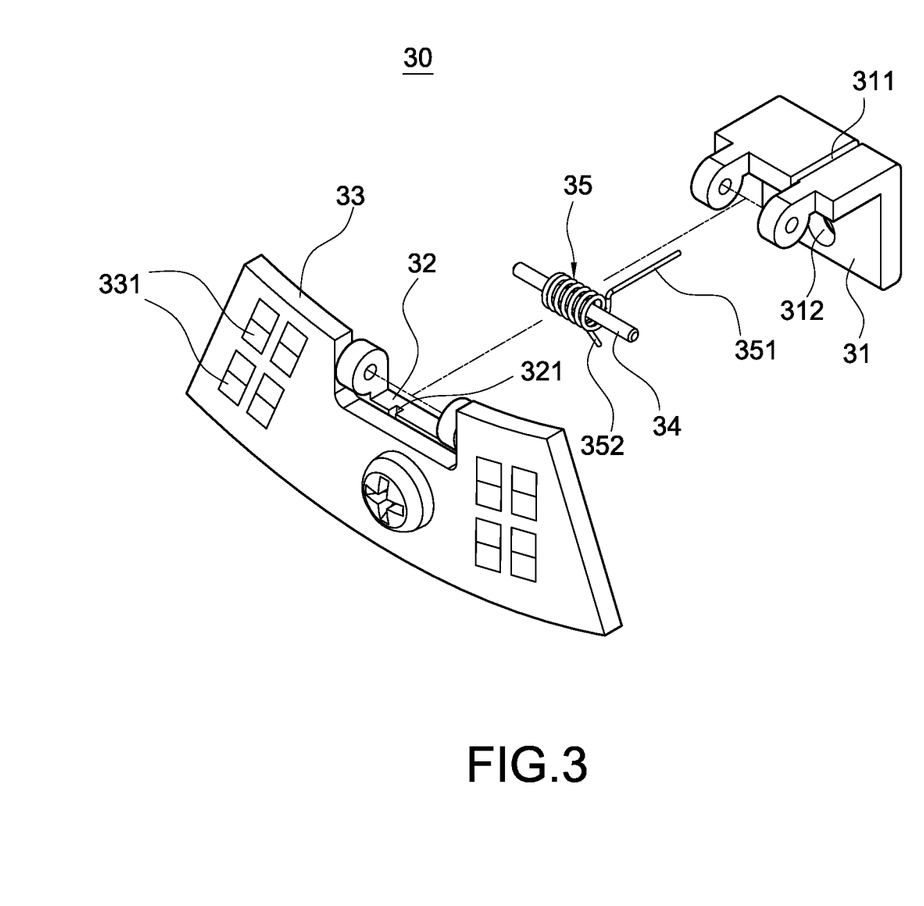
FIG. 3 is an exploded view of a variable projection angle light emitting module in accordance with the first preferred embodiment of the present invention.

With reference to FIGS. 1 and 3, the light emitting modules 30 can be driven to change their light projection direction. Each light emitting module 30 includes a fixing element 31 installed on the support base 20, a sway element 32 pivotally coupled to the fixing element 31 through a rotating shaft 34, a circuit board 33 installed on the sway element 32, and a plurality of light emitting diodes 331 installed on the circuit board 33.

Each fixing element 31 is fixed onto the support base 20 by inserting a screw 36 through a screw hole 312 of the fixing element 31. Preferably, the light emitting diodes 331 are white light emitting diodes. In addition, the light emitting modules 30 can be controlled independently to project lights. In other words, users can select one or more (including all) of the light emitting modules 30 for projecting the light. For example, three adjacent light emitting modules 30 are selected for the light projection in order to produce a special shadow effect to the object to be photographed.

The circuit board 33 can be outwards swayed by the drive mechanism to make the light emitting diode 331 on the circuit board 33 change its light projection angle. In addition, each light emitting module 30 further includes an elastic restoring element 35 put around the rotating shaft 34. The elastic restoring element 35 can be a spring, with a distal portion 351 embedded in a groove 311 of the fixing element 31, and the other distal portion 352 of the elastic restoring element 35 embedded in a groove 321 of the sway element 32 for exerting a force which makes the sway element 32 inwards sway.

With reference to FIGS. 1 and 2, the outer barrel 40 is put around the inner barrel 10 and coupled to the support base 20. In this preferred embodiment, the outer barrel 40 and the support base 20 are coupled by passing and securing a fastening element such as a screw (not shown in the figure) into a screw hole 41 of the outer barrel 40 and a screw hole 221 of the inner barrel 20. The outer barrel 40 includes a plurality of slots 42 formed therein and extended along the axis I. In this preferred embodiment, three slots 42 are adopted; of course, two or more slots 42 can be adopted in other practical applications.

The pushing ring 50 is installed between the inner barrel 10 and the outer barrel 40 and can be moved along the axis I. The pushing ring 50 includes a ring body 51, a plurality of pushing rods 53 extending from the ring body 51 and penetrating the extended portion 22 of the support base 20. The pushing rods 53 are pressed against the circuit boards 33 separately. In addition, the pushing ring 50 further includes a plurality of sliding rods 52 extended outwardly from the ring body 51 and passed into the slots 42 respectively.

The rotating ring 60 is put around the outer barrel 40, and includes a plurality of oblique slots 61 formed at positions separately corresponding to the slots 42. Each oblique slot 61 corresponds to each slot 42 for being inserted by each sliding rod 52.

Figure 4:
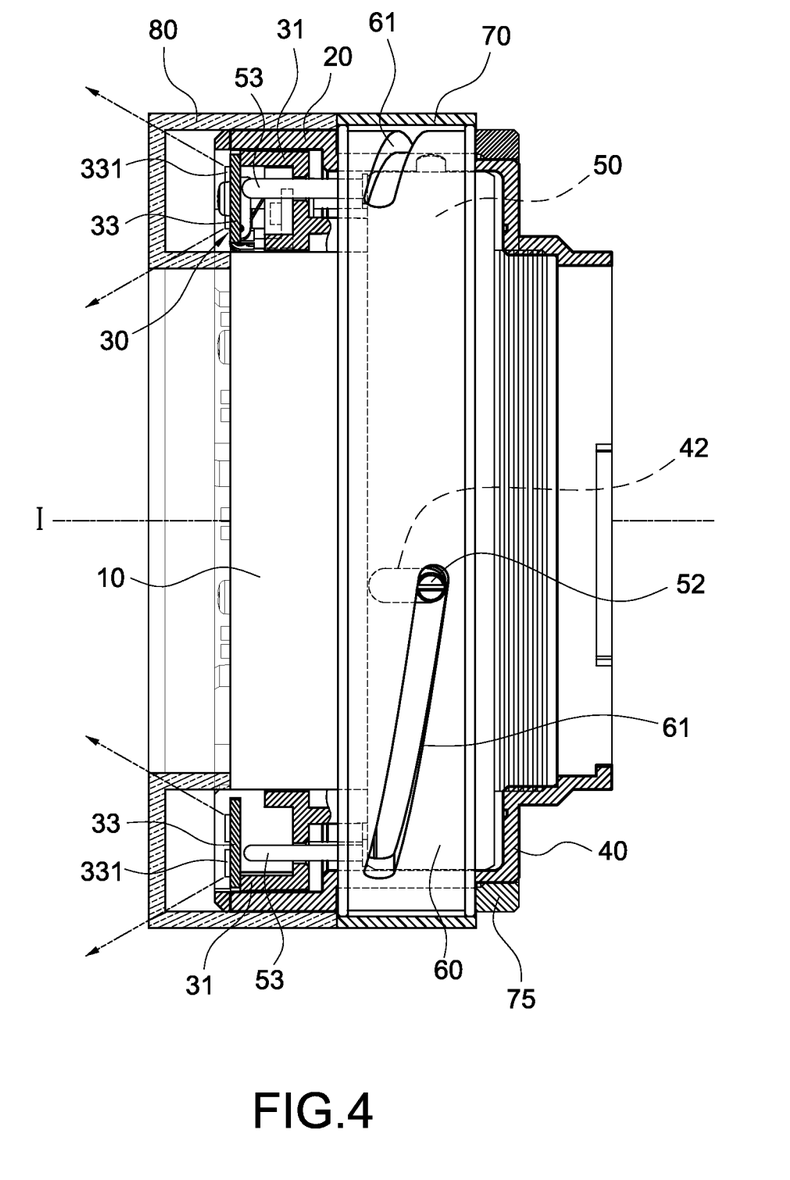
FIGS. 4 and 5 are schematic views of an operation in accordance with the first preferred embodiment of the present invention.
Figure 5:
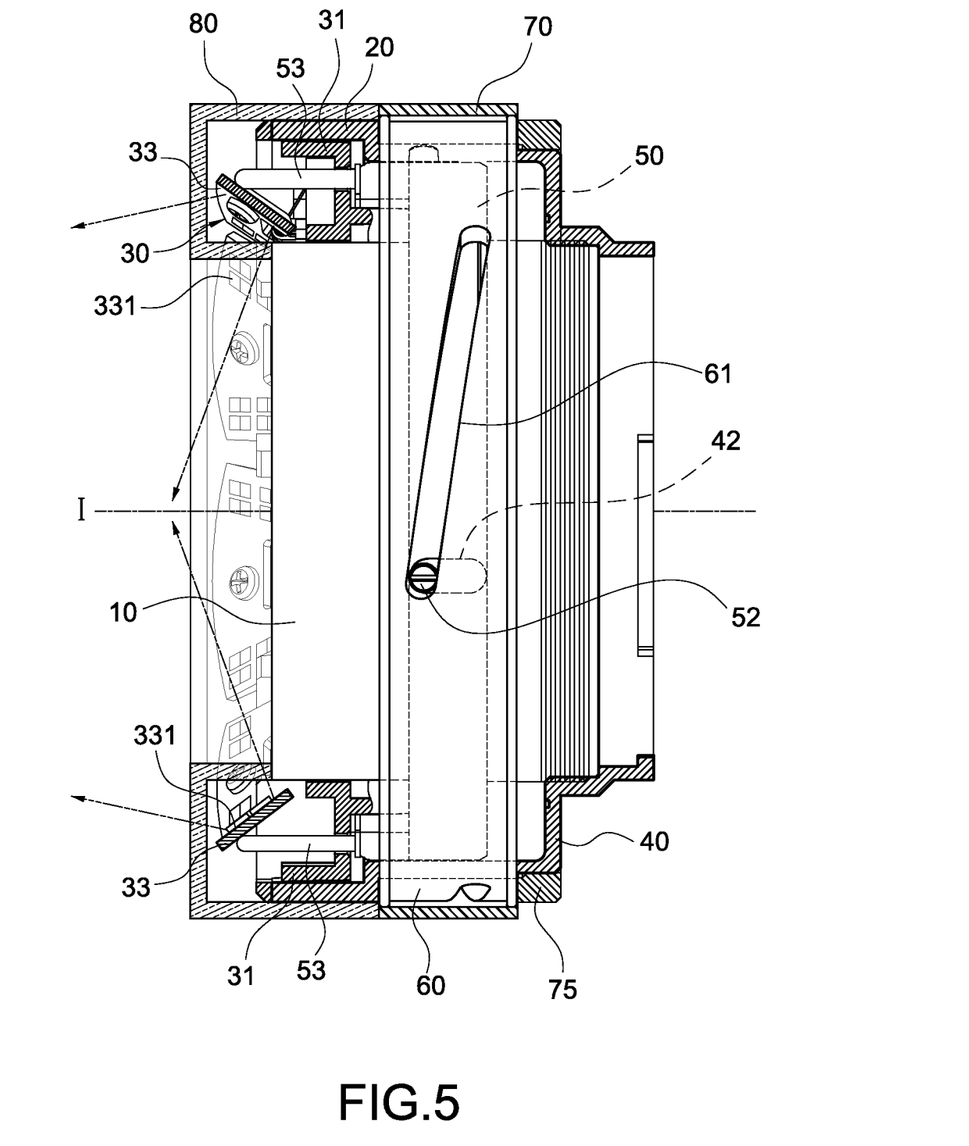

In addition, the ring light apparatus of the present invention further includes an anti-slip ring 70 put around the rotating ring 60 and a fixing ring 75, and the anti-slip ring 70 is provided to facilitate users to hold and rotate the rotating ring 60. The fixing ring 75 is provided for fixing the rotating ring 60 and preventing it from falling off With reference to FIGS. 4 and 5 for an actual operation, the rotating ring 60 is rotated about the axis I, such that the oblique slot 61 forces the sliding rod 52 to move inside the slot 42 along the axis I, and also forces the pushing rod 53 of the pushing ring 50 to push the circuit board 33 of the light emitting module 30 in order to change the light projecting direction thereof, such that the light can be concentrated around the axis I. If an object to be photographed is very close to the ring light apparatus of the invention, a uniform brightness can be effectively provided to the object without a relatively darker center.

The ring light apparatus of the invention can be installed to an optical imaging device such as a digital camera or a microscope, so that a uniform brightness can be provided to a close object effectively for macro photography.

In addition, the ring light apparatus of the invention further includes a circular transparent protecting cover 80 installed on the front of the light emitting modules 30 for protecting the light emitting module 30 from being collided or damaged by external objects. Further, the protecting cover 80 can be painted with a color to change the color temperature of the light projected by the light emitting modules 30.

Figure 6:
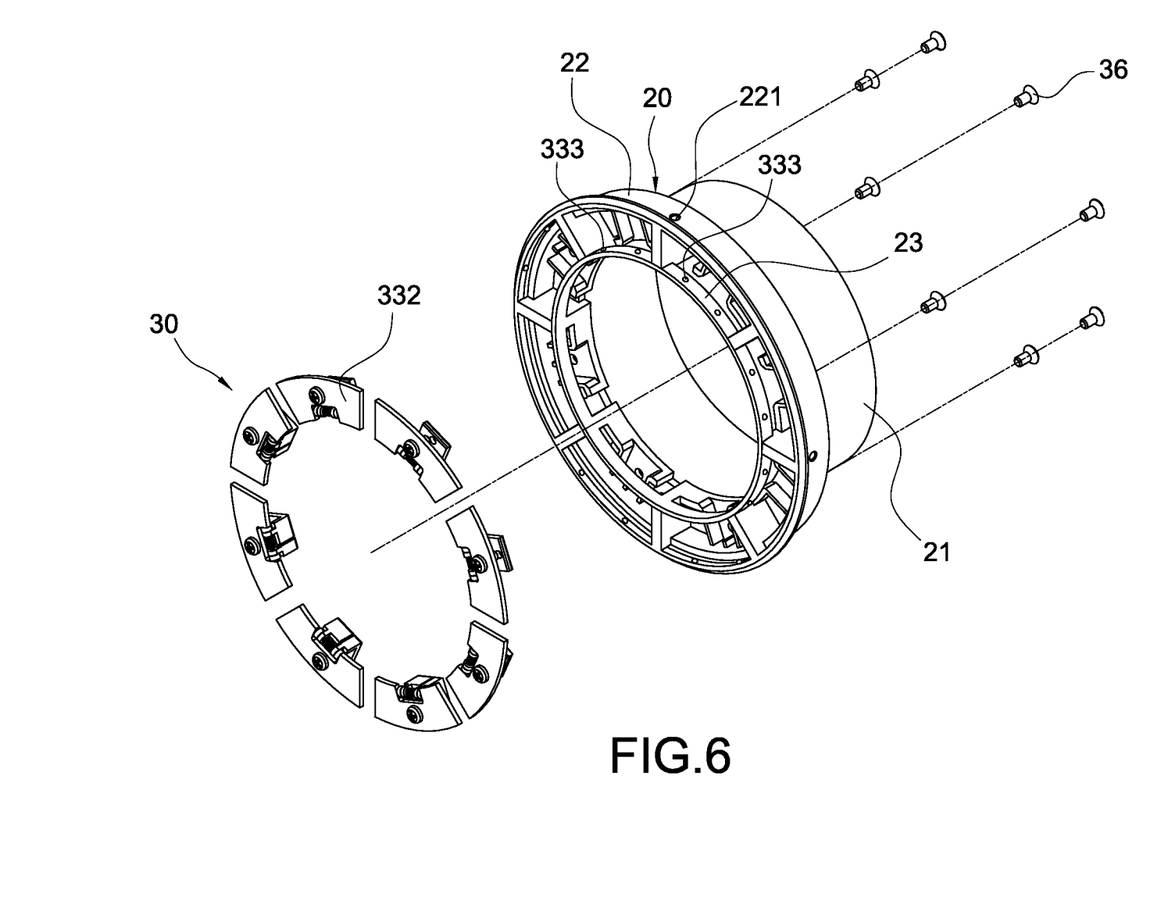
FIG. 6 is an exploded view of a variable projection angle ring light apparatus in accordance with the second preferred embodiment of the present invention.
Figure 7:
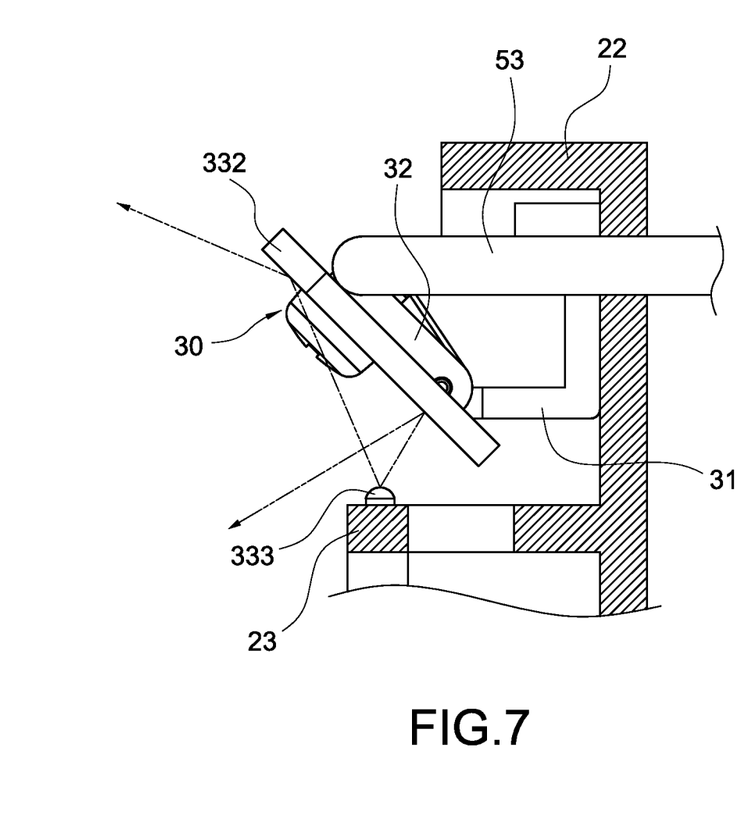
FIG. 7 is a schematic view of an operation in accordance with the second preferred embodiment of the present invention.

With reference to FIGS. 6 and 7 for a ring light apparatus in accordance with the second preferred embodiment of the present invention, this preferred embodiment is substantially the same as the first preferred embodiment, except that this preferred embodiment changes the light projection direction by a reflection manner. In the figures, the light emitting module 30 includes a fixing element 31 installed on the support base 20, a sway element 32 pivotally coupled to the fixing element 31, a reflecting plate 332 installed on the sway element 32, and a plurality of light emitting diodes 333 installed on the support bases 20 separately, and lights emitted by the light emitting diodes 333 are reflected from the reflecting plate 332 toward the outside. The reflecting plate 332 can be driven by the drive mechanism and swayed to drive the reflecting plate 332 to change a light projection direction.

Figure 8:
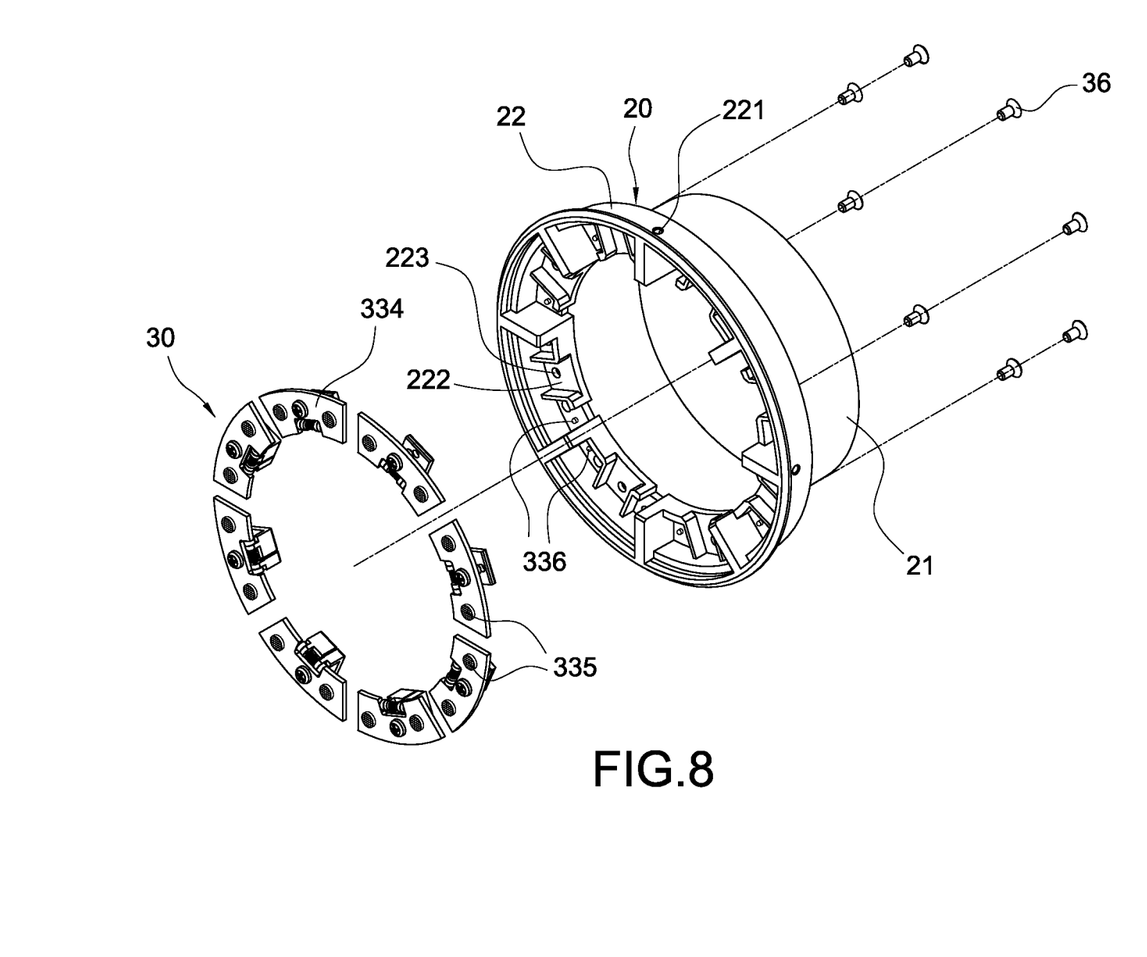
FIG. 8 is an exploded view of a variable projection angle ring light apparatus in accordance with the third preferred embodiment of the present invention.
Figure 9:
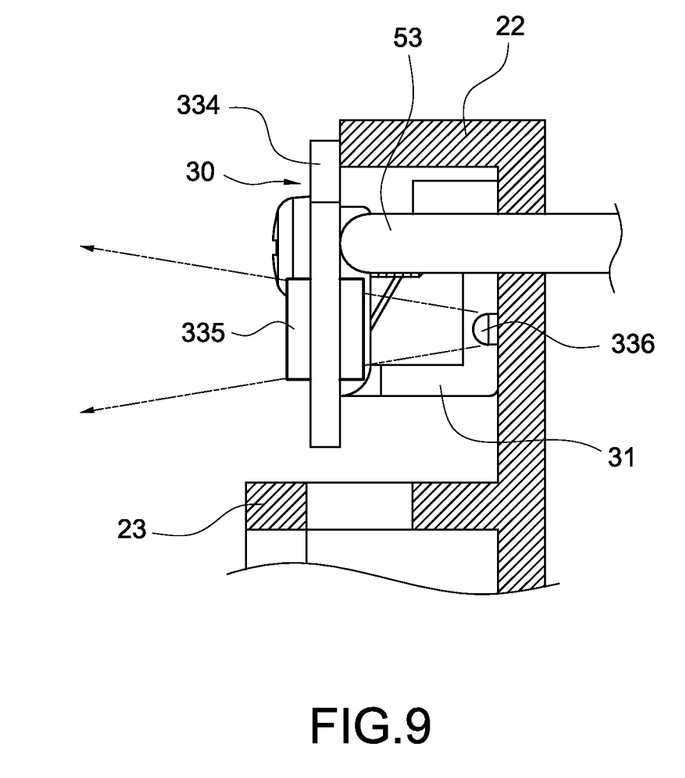
FIG. 9 is a schematic view of an operation in accordance with the third preferred embodiment of the present invention.

With reference to FIGS. 8 and 9 for a ring light apparatus in accordance with the third preferred embodiment of the present invention, this preferred embodiment is substantially the same as the first preferred embodiment, except that this preferred embodiment changes the light projection direction by a light guiding manner. In the figures, the light emitting module 30 includes a fixing element 31 installed on the support base 20, a sway element 32 pivotally coupled to the fixing element 31, a support plate 334 installed on the sway element 32, at least one light guide element 335 installed on the support plate 334, and a plurality of light emitting diodes 336 installed on the support base 20, and lights emitted by the light emitting diode 336 are guided by the light guide element 335 and projected to the outside. The light guide element 335 can be a hollow or solid integration rod. The pushing rods 53 are pressed against the support plates 334 separately, and the support plates 334 are driven by the drive mechanism to sway and drive the light guide element 335 to change the light projection direction.

When the ring light apparatus of the present invention is used for taking a picture of an object at a very close distance, the light projection angle of the ring light apparatus is changeable, and lights can be projected primarily towards the axis I to provide a uniform light to the object, so as to prevent a non-uniform brightness with a darker center and a brighter periphery of the object caused by the ring light.

Since the variable light projection angle of ring light of the present invention can selectively use one or more (including all) of the light emitting modules 30 for projecting lights and producing a special shadow effect to the object to be photographed, the three-dimensional perception of the object can be enhanced.

While the invention has been described by means of specific embodiments, numerous modifications and variations could be made thereto by those skilled in the art without departing from the scope and spirit of the invention set forth in the claims.

What is claimed is:

1. A ring light apparatus, comprising:
an inner barrel;
a support base, disposed at an end of the inner barrel;
a plurality of light emitting modules, installed onto the support base, and capable of changing a light projection direction, wherein each of the light emitting modules further comprises:
a fixing element installed on the support base;
a sway element pivotally coupled to the fixing element;
a circuit board installed on the sway element; and
a plurality of light emitting diodes installed on the circuit board; and
a drive mechanism, installed outside the inner barrel, for driving the light emitting modules to change the light projection direction, the drive mechanism comprising:
an outer barrel, put around the inner barrel, coupled to the support base and having a plurality of slots;

a pushing ring, axially movably installed between the inner barrel and the outer barrel, and the pushing ring further including:
  a ring body;
  a plurality of pushing rods, extending from the ring body, penetrating the support base and leaned against the circuit boards separately; and
  a plurality of sliding rods extending outwardly from the ring body and penetrating the slots separately; and
a rotating ring, put around the outer barrel, and the rotating ring further including a plurality of oblique slots formed at positions corresponding to the slots separately, and each oblique slot corresponding to each slot and provided for being inserted by each sliding rod;
whereby the oblique slots force the sliding rods to move inside the slots and to make the pushing rods of the pushing ring push the sway elements if the rotating ring rotates.

2. The ring light apparatus of claim 1, wherein each light emitting module further comprises an elastic restoring element for exerting a force making the sway element sway inwards.

3. The ring light apparatus of claim 1, wherein the light emitting diodes are white light emitting diodes.

4. The ring light apparatus of claim 1, wherein each of the light emitting modules further comprises
  a reflecting plate installed on the sway element,
  whereby light emitted from the light emitting diodes is reflected by the reflecting plate and projected towards the outside, and the reflecting plate is swayed by the drive mechanism to change a light projection direction.

5. The ring light apparatus of claim 4, wherein each light emitting module further comprises an elastic restoring element for exerting a force making the sway element inwards sway.

6. The ring light apparatus of claim 4, wherein the light emitting diodes are white light emitting diodes.

7. A ring light apparatus, comprising:
  an inner barrel;
  a support base, disposed at an end of the inner barrel;
  a plurality of light emitting modules, installed onto the support base, and capable of changing a light projection direction; and
  a drive mechanism, installed outside the inner barrel, for driving the light emitting modules to change the light projection direction;
  wherein each the light emitting module further comprises:
    a fixing element installed on the support base;
    a sway element pivotally coupled to the fixing element;
    a support plate installed on the sway element;
    at least one light guide element installed on the support plate; and
    a plurality of light emitting diodes installed on the support base;
    whereby light emitted from the light emitting diodes are guided by the light guide element, and the support plate is swayed by the drive mechanism to change a light projecting direction.

8. The ring light apparatus of claim 7, wherein the drive mechanism further comprises:
  an outer barrel, putting around the inner barrel, coupled to the support base and having a plurality of slots;
  a pushing ring, axially movably installed between the inner barrel and the outer barrel, and the pushing ring further including:
    a ring body;
    a plurality of pushing rods, extending from the ring body, penetrating the support base and leaned against the circuit boards separately; and
    a plurality of sliding rods extending outwardly from the ring body and penetrating the slots separately; and
  a rotating ring, putting around the outer barrel, and the rotating ring further including a plurality of oblique slots formed at positions corresponding to the slots separately, and each oblique slot corresponding to each slot and provided for being inserted by each sliding rod;
  whereby the oblique slots force the sliding rods to move inside the slots and to make the pushing rods of the pushing ring push the light guide elements of the light emitting modules if the rotating ring rotates.

9. The ring light apparatus of claim 7, wherein each variable projection angle light emitting module further comprises an elastic restoring element for exerting a force making the sway element inwards sway.

10. The ring light apparatus of claim 7, wherein the light emitting diodes are white light emitting diodes that emit white light.

11. The ring light apparatus of claim 1, wherein the support base is substantially in a circular shape.

* * * * *